United States Patent
Akiyama et al.

[11] Patent Number: 6,141,955
[45] Date of Patent: *Nov. 7, 2000

[54] GAS TURBINE GENERATOR WITH DUAL STEAM-INJECTED TURBINES

[75] Inventors: Kazuho Akiyama, Tokyo; Shigekazu Uji, Ichikawa; Masaru Hirata, Kashiwa, all of Japan

[73] Assignee: Ishikawajima-Harima Heavy Industries Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,912

[22] Filed: Dec. 23, 1997

[30] Foreign Application Priority Data

Dec. 27, 1996 [JP] Japan ................................ 8-351190

[51] Int. Cl.$^7$ ................................................ F02C 3/30

[52] U.S. Cl. ........................ 60/39.15; 60/39.3; 60/39.59

[58] Field of Search ........................ 60/39.15, 39.163, 60/39.182, 39.3, 39.55, 39.59

[56] References Cited

U.S. PATENT DOCUMENTS

| | | | |
|---|---|---|---|
| 2,547,660 | 4/1951 | Prince | 60/39.15 |
| 2,677,932 | 5/1954 | Forsling | 60/39.15 |
| 3,868,818 | 3/1975 | Itoh | 60/39.163 |
| 5,239,830 | 8/1993 | Banthin et al. | 60/39.15 |

FOREIGN PATENT DOCUMENTS 6248974  9/1994  Japan .

*Primary Examiner*—Louis J. Casaregola
*Attorney, Agent, or Firm*—Griffin & Szipl, P.C.

[57] ABSTRACT

A gas turbine generator includes a first gas turbine 20 having an air compressor 21, first turbine 24a and a first combustor 25a; a second gas turbine 22 having a second turbine 24b and a second combustor 25b; a generator 27 driven by the first gas turbine and the second gas turbine; and a coupling 23 arranged between the generator and the second gas turbine for connection and disconnection. When residual steam is sufficiently supplied, the residual steam is fed to the first combustor and the second combustor while connecting the coupling, and when the residual steam is not sufficiently supplied, the residual steam is fed to only the first combustor while disconnecting the coupling.

4 Claims, 4 Drawing Sheets

WASTE HEAT BOILER

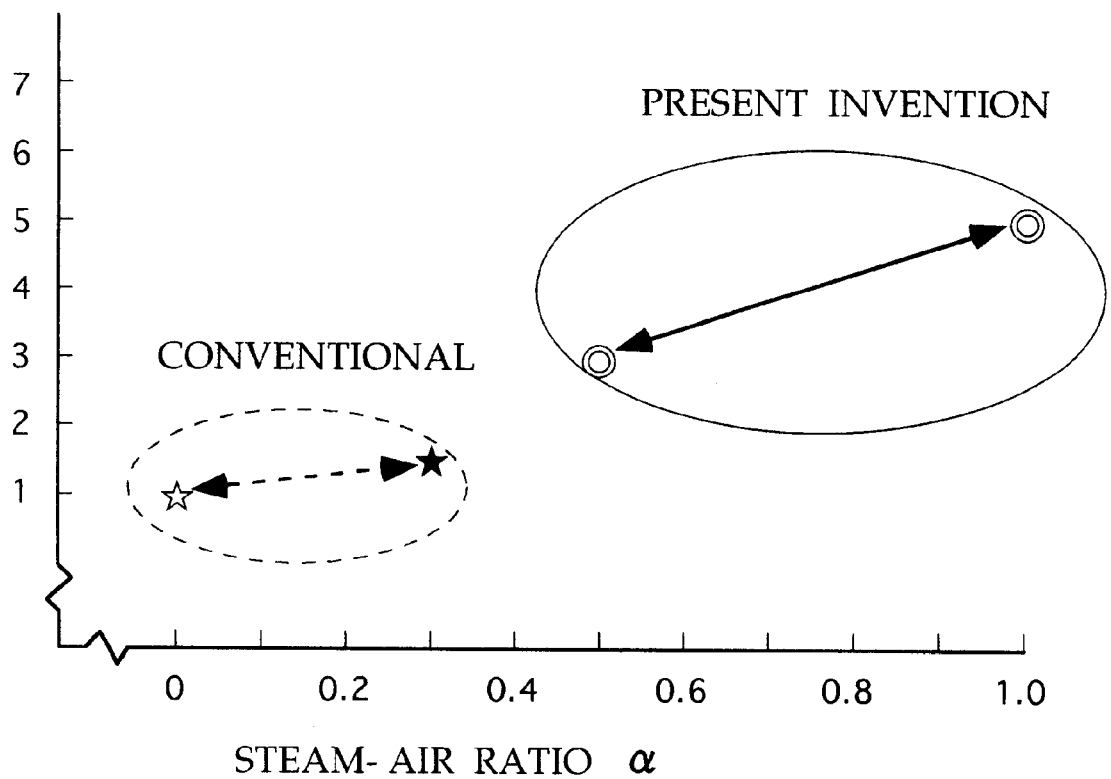

GAS TURBINE GENERATOR WITH DUAL STEAM-INJECTED TURBINES

BACKGROUND ART

1. Field of the Invention

The present invention relates to a gas turbine generator used in gas turbine cogeneration in which power or electric power and steam are generated to realize energy-saving.

2. Description of the Related Art

According to the configuration of a conventional dual fluid cycle gas turbine generator, for example as shown in FIG. 1, air A sucked in from the atmosphere is compressed by a compressor 1 and fed to a combustor 2. The compressed air becomes a high-temperature combustion gas by the combustion of a fuel F, and led to a turbine 3. After driving the turbine, the combustion gas E generates steam in waste-heat boiler 4 and is emitted into the atmosphere. Steam S generated in waste-heat boiler 4 is injected to the combustor 2, increases the flow of the combustion gas which enters the turbine 3, increases the specific heat of the combustion gas, and increases the output of the turbine 3. The output from the turbine 3 drives the compressor 1 and simultaneously generates electric power by driving a generator 5. An economizer 6 and a stack 9 are provided downstream of the waste-heat boiler 4 which is heated by the waste-heat from the turbine.

On the other hand, according to a conventional regenerative cycle gas turbine generator, for example as shown in FIG. 2, a heat exchanger 7 is provided downstream of the turbine 3. The air A compressed by the compressor 1 is preheated by the turbine waste heat E by the heat exchanger 7, and is fed to the combustor 2 to raise the temperature of the compressed air and to reduce the consumption of fuel F in the combustor 2.

However, in the above-described dual fluid cycle gas turbine generator (FIG. 1), when the entire amount of the steam generated by the waste-heat boiler 4 is injected to the combustor 2, the amount of injected steam reaches 20% to 30% of the taken in air. (1) Consequently, if the injection of steam stops, the flow rate in the turbine is too low and the efficiency of the turbine is badly reduced, thereby considerably lowering the thermal efficiency. (2) Furthermore, since the injected steam is emitted together with the exhaust gas into the atmosphere, there has been a problem that the more the steam is injected, the more the costs for generating the steam from pure water.

On the other hand, in the regenerative cycle gas turbine generator (FIG. 2) described above, since the temperature at the exit of the compressor 1 is high, there has been a problem that the preheating of air is limited and the thermal efficiency cannot be largely improved. With this regenerative cycle gas turbine generator, all of the compressed air from the compressor is preheated by the waste heat in the heat exchanger before it is fed to the combustor. (3) Therefore, the pressure loss in the piping before and after the heat exchanger reduces the thermal efficiency. (4) Additionally, a large thermal capacity causes a problem with control response. (5) Furthermore, a considerably large bypass valve 8 (see FIG. 2) is required to bypass the heat exchanger to prevent the turbine from running at an overspeed during the load shed.

To solve the problem described above, the applicant of the present invention has developed and filed a partial-regenerative dual fluid cycle gas turbine generator (Japanese Patent Application Laid-Open No. 7-248974 in 1995). As shown in FIG. 3, the gas turbine generator includes a gas turbine having a compressor 1, a combustor 2, and a turbine 3; a mixer 10 for compressing air using steam as driving power and mixing both fluids; a superheater 12 for heating a mixed gas with the waste heat of the turbine; a waste-heat boiler 4 for evaporating water using the exhaust of the turbine as a heat source; an air line 15 for feeding a part of the air compressed by the compressor to a combustor and feeding the remainder to the mixer; a main steam line 16 for supplying a part of the steam generated by the waste-heat boiler to the mixer; and a mixed gas line 17 for feeding the mixed gas from the mixer to the combustor through the superheater 12. According to the invention, the amount of the steam injected into the combustor can be reduced, and the pressure loss in the piping before and after the superheater can also be reduced, thereby preventing the thermal efficiency from being lowered.

Recently, for example, a refuse-powered generator system, etc has been suggested using residual steam generated from a refuse incinerator by applying the dual fluid cycle, the regenerative cycle, and the partial regenerative dual fluid cycle shown in FIGS. 1 through 3. According to this refuse generator system, as shown in FIG. 4, residual steam S is heated by the waste heat from the turbine 3, and is provided for the combustor 2 of the gas turbine so that the flow of the turbine increases, the output of the generator also increases, and the entire thermal efficiency is enhanced. Such refuse incinerator systems are disclosed by (1) "Super Refuse-powered Generator System in Steam-jet-type Gas Turbine Method—performance characteristics and examples of their practical study" (Lecture theses published in the 5th Symposium of Power and Energy Technology in 1996, Japan Mechanical Society, 1996-11-13,14); (2) "Performance Characteristics of Refuse-powered Generator System using Steam-jet-type Gas Turbine" (The 8th Symposium of Thermal Technology in Jul. 7, 1995); etc. According to the conventional refuse-powered generator system described above, the output and thermal efficiency of the entire gas turbine increase as the steam-air ratio $\alpha$ increases (the steam-air ratio a is the ratio of the injected steam Gs to the air intake Ga: namely $\alpha=Gs/Ga$). Therefore, when a large volume of residual steam is generated from a refuse incinerator, it is desired that the steam-air specific ratio oz has the largest possible value.

However, in the conventional refuse-powered generator system, there have been the following problems. That is, (1) when the combination of a compressor and a turbine is kept as original, the steam-air ratio $\alpha$ is approximately 20% to 30% at maximum. A ratio higher than these values disturbs the matching between the compressor and the turbine, and the generator cannot be operated at a constant revolution speed. (2) If the compressor is kept as original and only the turbine is relatively enlarged, the steam-air ratio a can be increased up to, for example about 50% to 60%. If the turbine is made larger, when the operation of a refuse incinerator is stopped, the stable operation of the turbine is not obtained, whereby stable supply of electric power becomes difficult.

SUMMARY OF THE INVENTION

The present invention has been developed to solve the problems described above. That is, an object of the present invention is to provide a gas turbine generator which increases the steam-air ratio a much more than the conventional technology by using residual steam, thereby improving the entire output from the gas turbine and the thermal efficiency, and, even if residual steam is unavailable, electric power can be stably supplied.

According to the present invention, there is provided a gas turbine generator comprising: a first gas turbine which comprises an air compressor and a first turbine interconnected therebetween and a first combustor, and which combusts a fuel with compressed air from the compressor and drives the first turbine using the combustion gas of the first combustor; a second gas turbine which comprises a second turbine and a second combustor, and which combusts a fuel with compressed air from the compressor and drives a second turbine using the combustion gas of the second combustor; a generator driven by the first gas turbine and the second gas turbine; and a coupling arranged between the generator and the second gas turbine to connect and disconnect the generator and the second gas turbine, whereby when a residual steam is sufficiently supplied, the residual steam is fed to the first combustor and the second combustor with connecting the coupling, and when the residual steam is not sufficiently supplied, the residual steam is fed to only the first combustor with disconnecting the coupling.

With the configuration described above, when residual steam is sufficiently supplied, the residual steam is fed to the first combustor and the second combustor with connecting the coupling so that the amount of the gas flowing through each turbine can be optimized even if the steam-air ratio α in the first turbine and the second turbine is increased much more (for example, up to about 60% to 100%) than in conventional technology. Thus, the output of the entire gas turbine and the thermal efficiency can be improved. When the residual steam is not available, or when the residual steam is short, the coupling is disconnected to feed the residual steam to only the first combustor in order to drive the generator by only the first gas turbine for continuous and stable power supply as in the conventional gas turbine. Furthermore, with the configuration described above, the combination of the compressor and the first turbine can be applicable as in the conventional technology. Therefore, the increase of equipment cost can be suppressed by avoiding the special design and production to make only a turbine relatively larger.

According to a preferred embodiment of the present invention, the gas turbine further comprises: a mixer for compressing air using steam as driving power and mixing both fluids; a superheater provided downstream of the first turbine and the second turbine for heating the mixed gas with waste heat of these turbines; a waste-heat boiler provided downstream the superheater for evaporating water using the exhaust of these turbines as a heat source; an air line for feeding a part of air compressed by the compressor to the first and second combustors and feeding a remainder to the mixer; a main steam line for supplying a part of the steam generated by the waste-heat boiler to the mixer; and a mixed gas line for feeding the mixed gas from the mixer to the first and second combustors through the superheater.

With the present configuration, since a mixer for mixing steam with compressed air is provided, a part of the compressed air is mixed with the steam by the mixer, and the mixed gas is preheated by the superheater and supplied to the first and the second combustors, the amount of the steam generated by the exhaust of the gas turbine can be reduced. As a result, the output of the gas turbine and the change in thermal efficiency can be reduced even if the amount of injected steam to the combustor is increased or decreased.

In yet another embodiment, the gas turbine further includes: an auxiliary steam line for feeding a remaining steam generated by the waste-heat boiler for a utility use; and a steam flow control valve provided on the main steam line, for dividing the steam generated by the waste-heat boiler into the main steam line and the auxiliary steam line. With the configuration, the steam generated in the waste-heat boiler is distributed to the main steam line and the auxiliary steam line through the steam flow control valve, and can be used for utility.

Furthermore, it is desired that the mixer is a steam-driven ejector for sticking compressed air in. With the present configuration, the pressure of the air can be raised using the steam as a driving source, thereby compensating the pressure loss between the mixer and the combustor and improving the thermal efficiency.

Other objects and advantageous characteristics of the present invention will become apparent from the following descriptions with reference to the accompanying drawings.

BRIEF DESCRIPTION OF THE DRAWINGS

FIG. 6 illustrates a comparison between the steam-air ratio and the output ratio.

DESCRIPTION OF THE PREFERRED EMBODIMENTS

Figure 1:
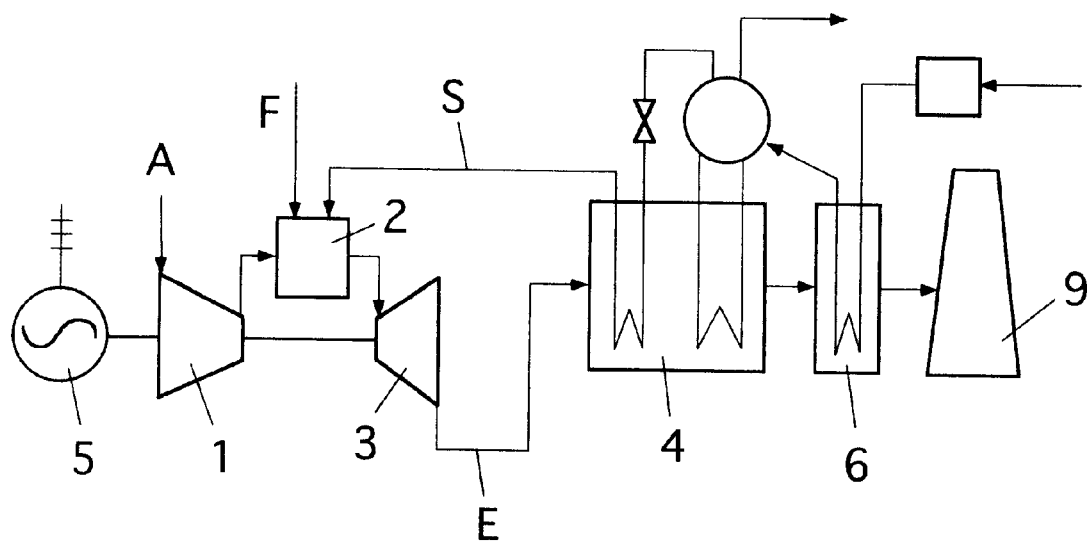
FIG. 1 is a general block diagram of a conventional dual fluid cycle gas turbine.
Figure 2:
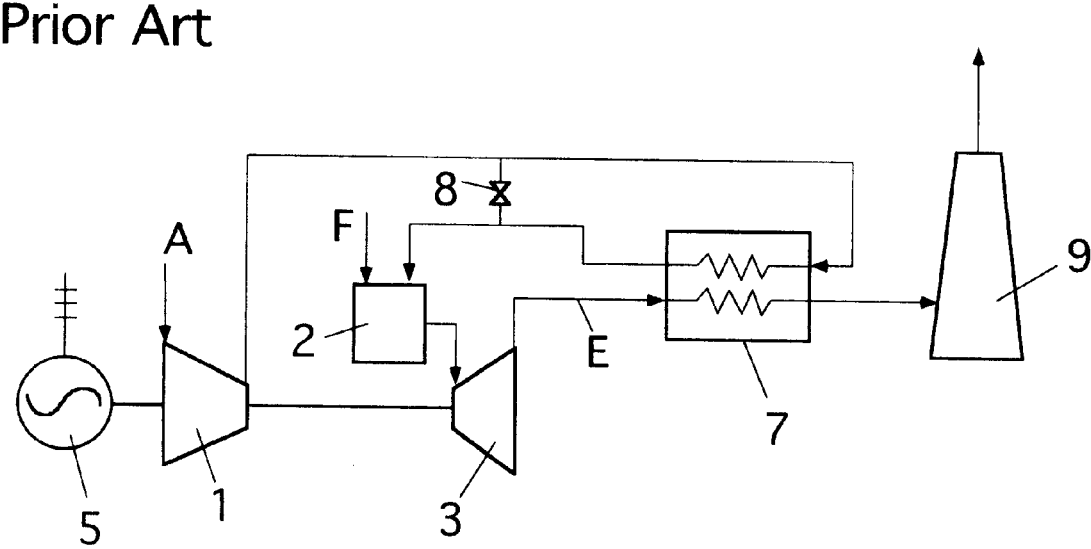
FIG. 2 is a general block diagram of a conventional regenerative cycle gas turbine.
Figure 3:
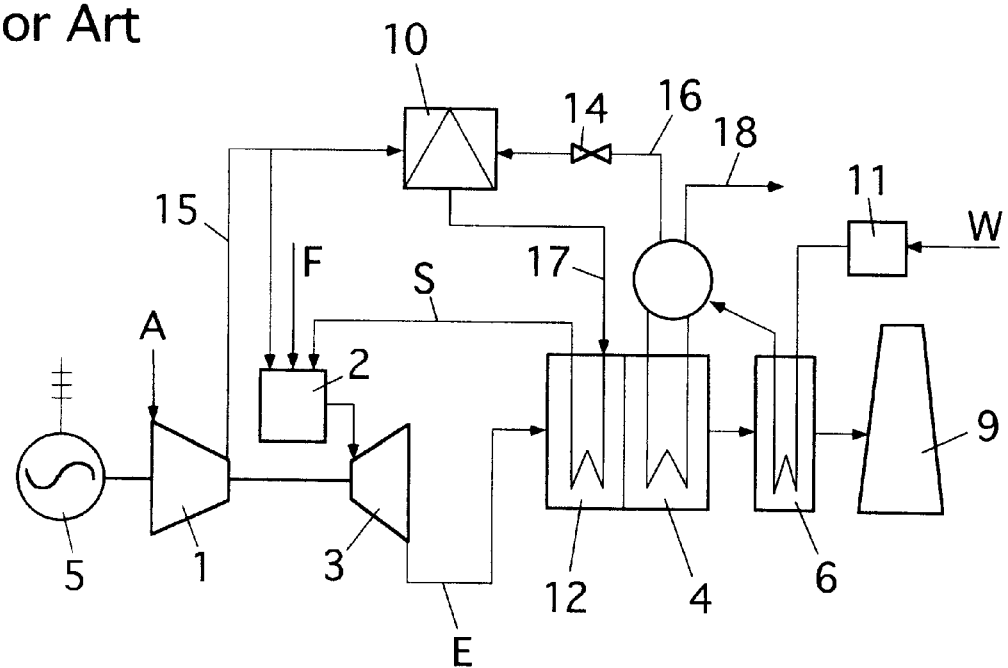
FIG. 3 is a general block diagram of a partial regenerative dual fluid cycle gas turbine previously filed by the Applicant of the present invention.
Figure 4:
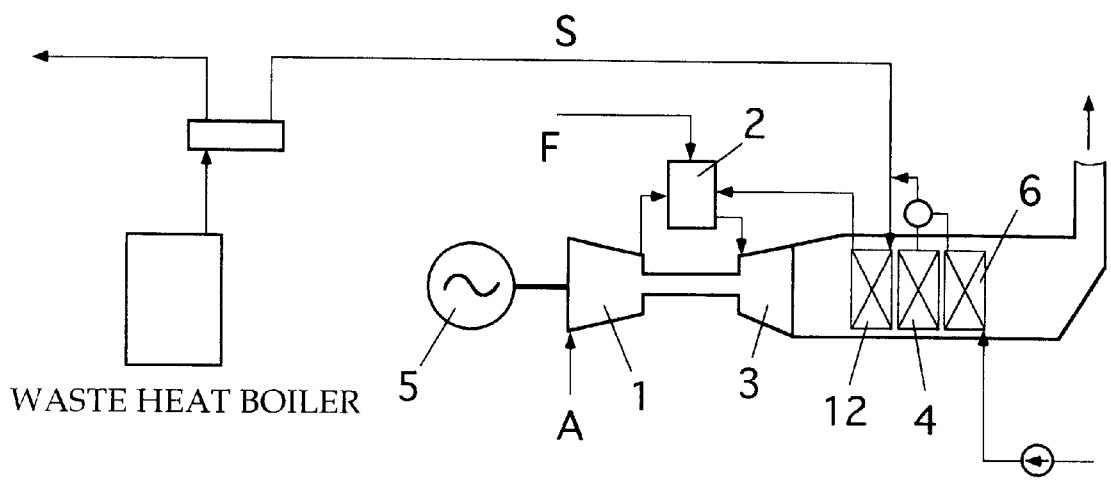
FIG. 4 is a block diagram of a conventional refuse-powered generator system.

A preferred embodiment of the present invention is described below by referring attached drawings. A part commonly appearing in a plurality of figures is assigned the same reference numeral.

Figure 5:
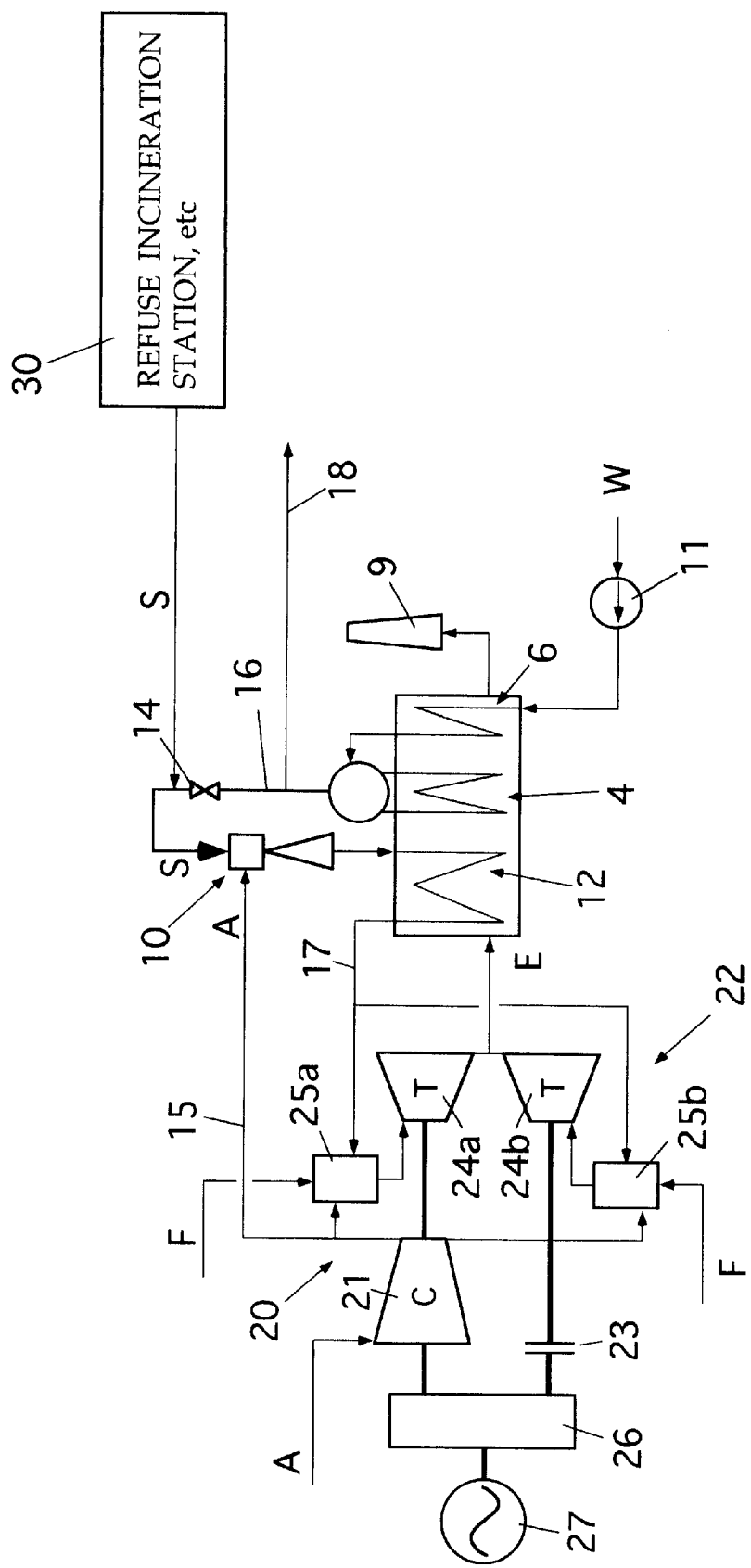
FIG. 5 is a block diagram of a gas turbine generator according to the present invention.

FIG. 5 is a general block diagram of a gas turbine generator according to the present invention. As shown in FIG. 5, the gas turbine generator comprises a first gas turbine 20, a second gas turbine 22, a generator 27, and a coupling 23. The gas turbine generator is provided near a refuse incineration station, a wood shop, a gas turbine power station (hereinafter referred to as a refuse incineration station 30), and receives residual steam S generated by the refuse incineration station 30.

The first gas turbine 20 comprises an air compressor 21, a first turbine 24a, and a first combustor 25a, and which combusts a fuel F with compressed air A from the air compressor 21. The combustion gas E drives the first turbine 24a. The configuration is the same as that of the conventional gas turbine.

The second gas turbine 22 comprises a second turbine 24b and a second combustor 25b, and combusts a fuel F with compressed air A from the air compressor 21. The combustion gas E drives the second turbine 24b.

Furthermore, a reduction gear 26 is provided between the generator 27 and the first gas turbine 20 and the second gas turbine 22, and reduces the rotation speed of each of the first gas turbine 20 and the second gas turbine 22, and drives the generator 27 at a predetermined synchronization speed (for example, 1500 rpm). Furthermore, the coupling 23 is provided between the generator 27 and the second gas turbine 22 (practically, between the reduction gear 26 and the second turbine 24b) so that they can be electrically connected/disconnected according to a signal from the control unit not shown in the drawings.

In FIG. 5, the gas turbine generator according to the present invention further comprises a mixer 10, a superheater 12, a waste-heat boiler 4, an air line 15, a main steam line 16, and a mixed gas line 17.

According to the present embodiment, the mixer 10 is a steam-driven ejector for intake of compressed air A. The pressure of the air can be raised using the steam S as a driving source, and both fluids are mixed with each other.

The superheater 12 is provided downstream the first turbine 24a and the second turbine 24b, and the mixed gas from the mixer 10 is heated up to a sufficiently high temperature. The waste-heat boiler 4 is provided downstream the superheater 12 to evaporate water using the exhaust of the turbine as a heat source. According to the present embodiment, the waste-heat boiler 4 and the superheater 12 are designed to be incorporated into a waste heat recovery apparatus. However, the present invention is not limited to this application. That is, the waste-heat boiler 4 and the superheater 12 can be structured separately.

The air line 15 feeds a part of air compressed by the compressor 21 to the first combustor 25a and the second combustor 25b, and feeds the remainder to the mixer 10. The main steam line 16 supplies a part of steam generated by a waste-heat boiler 4 to the mixer 10. The mixed gas line 17 feeds the mixed gas from the mixer 10 to the first combustor 25a and the second combustor 25b through the superheater 12.

The air line 15 comprises a line through which a part of air compressed by the air compressor 21 is supplied directly to the first combustor 25a and the second combustor 25b; and a line through which the remaining compressed air is fed to the mixer 10.

The gas turbine generator further comprises a auxiliary steam line 18 for supplying the remainder of the steam generated by the waste-heat boiler 4 as steam for utility purposes. A steam flow control valve 14 is provided for the main steam line 16. As a result, the steam generated by the waste-heat boiler 4 can be divided into the steam flowing through the main steam line 16 and the steam flowing through the auxiliary steam line 18.

A gas turbine generator according to the present invention shown in FIG. 5 operates as follows.

The air A is sucked in from the atmosphere with the pressure raised by the air compressor 21. A part of the air is supplied to the first combustor 25a and the second combustor 25b, and the remaining compressed air is drawn and supplied to the mixer 10.

The compressed air A whase pressure is raised by the pressure energy of the steam is mixed with the steam S by the mixer 10, fed to the superheater 12, heated by the waste heat from the first turbine 24a and the second turbine 24b, further fed to the first combustor 25a and the second combustor 25b, and raised in temperature by the combustion of the fuel F with the compressed air directly flowing from the air compressor 21 to the combustors 25a and 25b.

The high-temperature and high-pressure combustion gas E generated in the combustors 25a and 25b works in the turbines 24a and 24b, passes through the superheater 12, the waste-heat boiler 4, and the economizer 6 which recover waste heat, and is exhausted to the atmosphere through the exhaust stack 9.

Supplied water W is raised in pressure by the water supply pump 11, and fed to the economizer 6. The saturated water from the economizer 6 is fed to the waste-heat boiler 4 as supplied water, and the saturated water becomes saturated steam in the waste-heat boiler 4, measured by the steam flow control valve 14, mixed with the residual steam generated by the waste heat from the refuse incineration station 30, and fed to the mixer 10. In this case, it is possible that a part of the generated steam is not fed to the mixer 10, but is rather used as steam for utility purposes.

With the configuration described above, when there is sufficient residual steam generated by the waste heat from the refuse incineration station 30, the coupling 23 is connected to mix the residual steam with the air, and the mixture is heated by the superheater 12 and supplied to the first combustor 25a and the second combustor 25b. As a result, as shown in FIG. 6, the amount of the gas flowing to the turbines 24a and 24b can be reduced than a rated amount even if the steam-air ratio $\alpha$ is increased (for example, up to about 60% to 100%) much more than the conventional technology. (1) Therefore, the output of the entire gas turbine and the thermal efficiency can be improved.

(2) Furthermore, even if the refuse incineration station 30 stops its operation and residual steam is not available, or the residual steam is in short supply, continuous and stable power supply can be obtained by disconnecting the coupling 23 to feed the residual steam, after being mixed with air and heated by the superheater 12, to only the first combustor 25a in order to drive the generator 27 by the first gas turbine 20 only.

Furthermore, with the configuration described above, the combination of the compressor 21 and the first turbine 24b can be applicable as in the conventional technology. (3) Therefore, the increase of an equipment cost can be suppressed by avoiding the special design and production required to make only a turbine 24a relatively larger.

Additionally, since a part of the compressed air is mixed with the steam by the mixer, and the mixed gas is preheated by the superheater and supplied to the combustors 25a and 25b, the amount of the steam generated by the exhaust of the gas turbine can be reduced. As a result, the output of the gas turbines 20 and 22 and the change in thermal efficiency can be reduced even if the amount of injected steam to the combustor is increased or decreased. Furthermore, since the pressure of the air can be raised using the steam as a driving source, the mixer can reduce the pressure loss between the mixer and the combustor and improve the thermal efficiency.

The following effects are obtained by the above-described gas turbine generator.

(1) The waste heat of a gas turbine and the residual steam of a refuse incineration station can be converted as much as possible into electric power.

(2) A flexible generating operation can be implemented even if the steam from the refuse incineration station has been fluctuated or stopped.

(3) The amount of the exhausted carbon dioxide per unit of the obtained amount of electric power (kwh), thereby contributing as an effective means for preventing global warning.

That is, using the residual steam, the gas turbine generator increases the steam-air ratio $\alpha$ much more than the conventional technology, thereby improving the entire output from the gas turbine and the thermal efficiency. As a result, electric power can be stably supplied even if the residual steam is unavailable.

The preferred embodiments of the present invention have been described above, but the scope of the right of the present invention is not limited to these embodiments only.

On the contrary, the scope of the right of the present invention includes all improvements, modifications, and equivalent items contained in the attached claims.

What is claimed is:

1. A gas turbine generator comprising:

a generator;

a first gas turbine assembly operatively connected to drive the generator, and including a first turbine having an intake and an exhaust, a first combustor having an intake and an exhaust operatively connected to output exhaust gas to the intake of the first turbine;

a second gas turbine assembly operatively connected to drive the generator, including a second turbine having an intake and an exhaust, a second combustor having an intake and an exhaust operatively connected to output exhaust gas to the intake of the second turbine;

an air compressor having an intake and an exhaust operatively connected to output compressed air to the intakes of the first and second combustors;

a coupling arranged between the generator and the second gas turbine having a first configuration coupling the second gas turbine to the generator, and a second configuration decoupling the second gas turbine from the generator; and a mixed gas line connected to the inputs of the first and second combustors; and a controller, operatively connected to said coupling and programmed to couple and decouple said coupling, and connect and disconnect said mixed gas line from the second combustor, responsive to a flow rate of steam in said mixed gas line.

2. A gas turbine generator according to claim 1, further comprising:

a mixer disposed in said mixed gas line upstream of the first and second combustors, having an air intake, a steam intake, and an exhaust;

a superheater operatively connected to intake exhaust of the first and second turbines, and disposed in a flow path of the mixed gas line to heat a mixture of air and steam in the mixed gas line downstream of the mixer and upstream of the first and second combustors;

a waste-heat boiler operatively connected to intake exhaust downstream of the superheater and having a water intake, and a steam exhaust;

a compressed air line connecting the exhaust of the compressor to the air intake of the mixer;

a main steam line connecting the steam exhaust of the waste-heat boiler to the steam intake of the mixer.

3. A gas turbine generator according to claim 2, further comprising an auxiliary steam line, a valve provided in said main steam line, the valve being arranged to divert steam from the main steam line to the auxiliary line.

4. A gas turbine generator according to claim 2, wherein said mixer is a steam-driven ejector.

* * * * *